Patented Mar. 14, 1933

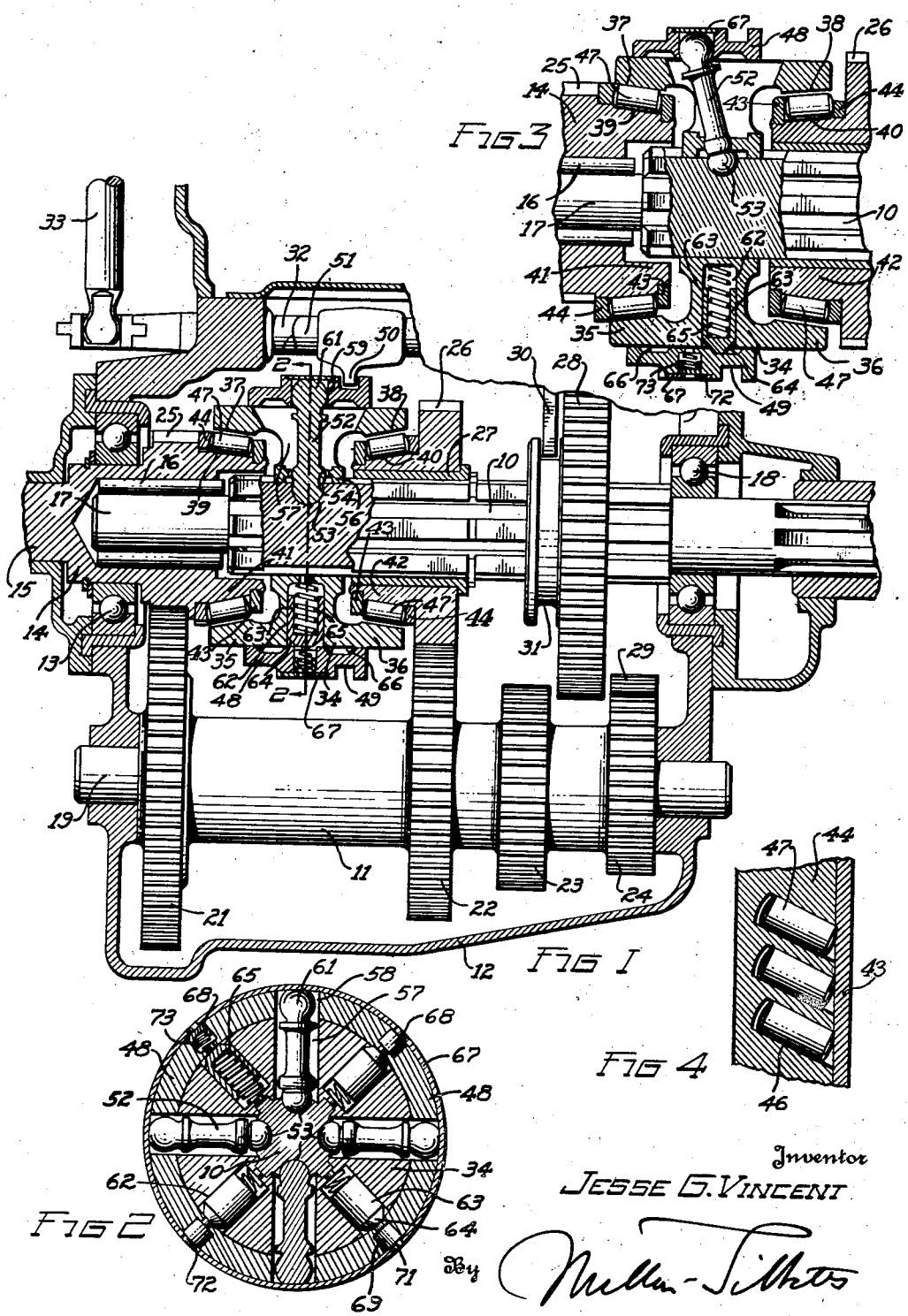

1,901,714

UNITED STATES PATENT OFFICE

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN

CLUTCH MECHANISM

Application filed December 2, 1930. Serial No. 499,514.

This invention relates to motor vehicles and more particularly to the transmission gearing of such vehicles.

In the operation of motor vehicles having conventional transmission gearing, after disconnection of the vehicle clutch and the previously meshed gears, the operator must either wait for a more rapidly moving gear element to lose speed, or in some instances must accelerate a more slowly moving gear by reconnecting it to the engine through the clutch. These maneuvers require a considerable measure of skill on the part of the operator and also prevent the free and rapid changing from one gear train to another as the exigencies of vehicle operation may dictate, so that gear changing has come to be considered as perhaps the most difficult task incident to the operation of a motor vehicle.

To assist the operator in making rapid and quiet gear changes it has been previously proposed to synchronize the gears to be meshed by various means, such as friction clutches. Such devices, however, have been open to certain objections. The mechanisms employed have been in general cumbersome and complicated, and the operating means difficult to operate and subject to excessive wear.

One of the objects of this invention is to provide a motor vehicle transmission having improved clutch devices for connecting a designated gear train to the driven member or shaft so as to transmit torque thereto, together with pressure multiplying means for engaging said devices and separate means for maintaining said engagement.

Another object of the invention is to provide a motor vehicle transmission having clutch devices provided with latch means adapted to yieldably retain said devices in engaged position and with a predetermined pressure.

A further object of the invention is to provide a motor vehicle transmission having clutch devices and operating and retaining means therefor, which are simple in construction, accessible and which may be readily assembled and taken down.

Other objects of the invention will appear from the following description taken in connection with the drawing, which form a part of this specification, and in which:

Fig. 1 is a view partially in side elevation and partially in longitudinal vertical section through a motor vehicle transmission embodying the present invention, the driving trains being shown in neutral position;

Fig. 2 is a transverse section taken substantially on the line 2—2 of Fig. 1;

Fig. 3 is a fragmentary view of part of the transmission shown in Fig. 1, showing the transmission clutch engaged in high speed position, and Fig. 4 is a detail section showing the arrangement of the rollers in the clutches illustrated.

Referring to the drawing, in Fig. 1 is shown a motor vehicle transmission comprising a splined transmission shaft 10 and a countershaft or gear spool 11, mounted in a housing or transmission case 12. The front wall of the housing 12 carries a suitable bearing 13 in which is mounted the enlarged rear end 14 of a driving shaft 15, which may be the vehicle clutch shaft, driven from the vehicle engine through conventional clutch mechanism (not shown). The enlarged end 14 of the clutch shaft is formed with an axial recess for the reception of a bearing 16, in which the reduced forward end 17 of the transmission shaft 10 is journaled. The rear end of the shaft 10 is journaled in a bearing 18, supported in the rear wall of the housing 12, and is connected in the usual way to the propeller shaft to drive the vehicle, this connection not being shown.

The countershaft 11 is in the form of a hollow spool, mounted to rotate on an arbor 19 supported at its ends by the transmission case walls, and this spool is formed with a number of integral gears 21, 22, 23 and 24. Of these, the gear 21 is in constant mesh with a gear or pinion 25, formed on the enlarged end 14 of the shaft 15, so that the countershaft 11 is continuously connected to and driven from this clutch shaft 15 in the well known manner. The gear 22 is also continuously in mesh with a gear 26 which is mounted for rotation on a bearing sleeve 27, pressed or otherwise rigidly mounted on the shaft 10 as will be readily understood.

Gears 23 and 24 constitute the low speed and reverse gears respectively, and are adapted to drive a gear 28 which is splined to and slidable on the shaft 10, this gear 28 being directly engageable with the gear 23. It may also be driven from the gear 24 through a reverse idler pinion 29 in the well known manner. The sliding of gear 28 on shaft 10 is effected in the usual way by means of a shifter fork 30, which engages in a groove 31 in the body of the gear 28, this fork being actuated by a shifter rod 32 slidably mounted in suitable bearings in the upper part or cover portion of the casing 12. The shifter rod 32 is selectively actuated by a shift lever 33 of usual form which may be manually operated by the vehicle driver.

Thus in the illustrated embodiment of the invention, gear 28 may be moved to mesh with gear 23, to provide a first speed, or connected through pinion 29 to gear 24 to provide reverse. Second speed is provided by connecting the constant mesh gear 26 to the shaft 10, and third or high speed is secured by coupling the shafts 10 and 15, thus providing a direct drive.

To provide the second and high speed connections described, the forward portion of the shaft 10 is provided with a clutch device which is slidably secured to the shaft to rotate therewith between the gears 25 and 26. This constitutes a splined hub 34, the splines of which cooperate with the splines of shaft 10, and which has axially extending portions 35 and 36 on which are formed oppositely disposed conical surfaces 37 and 38 respectively. These surfaces are arranged to overhang similarly inclined surfaces 39 and 40, which are formed respectively on extensions 41 and 42 on the end of the shaft portion 14 and on the body of gear 26. The adjacent ends of these surfaces are provided with end flanges or stops 43. Between each of the pairs of cooperating conical surfaces is arranged a movable clutch element which is preferably of the skewed roller type such as is shown and described for example, in the United States Patent No. 1,670,197 to Humfrey. This includes a suitable race 44 held in place by a stop 43 and having slots 46 inclined to the direction of rotation of the race. A cylindrical roller 47 is disposed in each of the slots 46 between the conical surfaces, as the surfaces 37 and 39, with its axis skewed by reason of the inclination of the slot to the axis of the cone. This arrangement constitutes a well known type of roller clutch, in which each of the rollers is wedged between and connects the cone surfaces in one direction of relative rotation, and releases these surfaces in the other direction, depending on the direction in which the roller axes are inclined.

Engagement of either clutch device is secured by sliding the hub member 34 in that direction to bring the surfaces 37, or the surfaces 38 as desired, into contact with the associated roller assembly. For this purpose, the hub 34 is surrounded by an actuating sleeve 48, having a shifter groove 49 in which is engaged a fork 50, similar to the fork 30. The fork 50 is actuated by a shifter rod 51 which may be selectively engaged by the gear lever 33.

Axial movement of the sleeve 48 is communicated to the hub 34 by means of levers 52, fulcrumed at their inner end in recesses or sockets 53 in the shaft 10 and having intermediate abutment portions 54 adapted to contact corresponding abutment portions 56 on the hub 34. These levers 52 extends through suitable slots 57 in the hub member 34 and project into corresponding aligned slots 58 in the sleeve 48, these slots 58 being of sufficient size to permit the insertion and removal of the levers. The ends of the slots 58 are provided with abutments 59 which contact corresponding abutment portions 61 on the outer ends of the levers. There may be any desired number of the levers 52, these being evenly spaced angularly of the shaft 10.

Intermediate the slots 57 the member 34 is provided with radially disposed cylindrical recesses 62, in which are mounted slidable plungers 63, preferably hollow, the outer ends of which are conical as clearly shown at 64. These plungers are urged radially outward by means of compression springs 65, which bear at their inner ends against the inner ends of the recesses 62, and at their outer ends against the plungers 63. The conical ends 64 are adapted to engage recesses 66 formed in the sleeve member 48, these recesses being spaced on either side of the midsection of the sleeve and corresponding to the high speed and second speed positions of the sleeve respectively. The recesses 66 are formed with tapered sides corresponding to the conical ends 64 of the plungers 63, so that upon a shifting movement of the sleeve 48 with respect to the hub 34 the plungers 63 will readily enter the recesses. By means of the cam engagement of the conical faces 64 with the tapered sides of the recesses 66, an axial force is exerted on the hub 34 urging it toward engaged position, and with a predetermined pressure depending on the strength of the springs 65.

To permit the clutch actuating mechanism above described, including the levers 52, to be easily assembled and disassembled, this invention provides suitable retaining means adapted to close the outer ends of the slots 58. In the form shown this comprises a circumferential band 67, surrounding the sleeve 48 to close the outer ends of the slots 58 and to provide a retaining means for the levers 52. The band 67 is axially removable from the sleeve 48, and is preferably removably secured in position thereon by spring-pressed latch members shown at 68. These members 68 may be in the form of plungers mounted in suitable radial recesses 69, which may be conveniently aligned with the recesses 62, and they are provided with locking ends 71 adapted to engage suitable holes 72 in the band 67. They are urged radially outward in any convenient way as by means of compression springs 73 as clearly shown in the drawing.

The operation of this device may be more clearly understood from an example. Assume that the transmission is in neutral as shown in Fig. 1, and that it is designed to shift into high gear or direct drive. The lever 33 is actuated to shift the rod 51 and the fork 50 to the left, thus sliding the sleeve 48 in the same direction. Movement of the sleeve causes an inclination of the levers 52 which thus move the hub member 34 on its splines, and this brings the conical clutch surface 37 into contact with the rollers 47 of the high speed clutch with considerable force. This forms a driving connection between the clutch surfaces 37 and 39 which operatively connects the shafts 10 and 15 to provide direct drive.

Just as the surface 37 is contacting the rollers, the conical latch 64 of the plunger 63 reaches the recess 66 and in response to the pressure of spring 65 is depressed therein, thus preventing accidental disengagement of the clutch surface 37 and the cooperating rollers. At the same time by reason of the inclined side faces of the recesses cooperating with the inclined ends of the latch members 64, a cam action is exerted whereby the hub member is urged toward its position of engagement, thus insuring positive contact of these members at adequate pressure. The return shift to neutral is accomplished by moving the lever 33 in the opposite direction, the action of the parts being obvious.

The device may be readily disassembled by removal of the retainer band 67. To accomplish this, the latch plungers 68 are retracted against their springs 73 in any convenient way, as by pushing the latch ends 71 radially inward with a suitable tool. This permits the band 67 to be removed axially exposing the ends of slots 58, through which the levers 52 can be removed. After removal of the levers the sleeve and hub assembly can be so moved as to give access to the roller clutches and to the other parts of the device.

While a specific embodiment of the invention has been herein described, which is deemed to be new and advantageous and may be specifically claimed, it is not to be understood that the invention is limited to the exact details of the construction, as it will be apparent that changes may be made therein without departing from the spirit or scope of the invention.

Having thus described the invention, what is claimed and desired to be secured by Letters Patent is:

1. In a transmission having a driving member and a driven shaft, clutch means comprising a clutch device carried by the driving member, a cooperating clutch member carried by the shaft and shiftable to selectively engage the clutch device, a slidable operating member, lever means to operatively connect the operating member to said clutch member, and the driven shaft and means carried by the clutch member to resiliently retain said operating member and said clutch member together in clutch engaging position.

2. In a transmission having a driving member and a driven shaft, clutch means comprising a clutch device on the driving member, a shiftable hub member on the driven shaft adapted to engage the clutch device, an operating member slidably mounted on the shiftable hub member, said member having axially spaced recesses, lever means anchored to the driven shaft and to the shiftable member, said lever means extending radially through the hub member, and yieldable means comprising spring pressed plungers carried by said shiftable member adapted to engage in said recesses to retain said member in clutch engaging position.

3. In a transmission having driving and driven members and a clutch device adapted to operatively connect said members and having an axially movable clutch member, an axially slidable operating sleeve slidably mounted on the movable clutch member and having internal circumferential grooves with inclined sides, pressure multiplying levers connecting the operating sleeve to the movable clutch member, and yieldable means radially mounted in the movable member and adapted to engage the inclined sides of the grooves to urge the clutch member toward engaged position.

4. In a transmission, a clutch engaging member, an operating member surrounding and slidable on said clutch engaging member, both members having radially aligned slots, levers disposed in said slots to connect said members in operative relation, and a circumferentially disposed band to retain the levers in said slots.

5. In a transmission, a clutch engaging member, an operating member surrounding and slidable on said clutch engaging member, both members having radially aligned slots extending through the operating member, radially disposed connecting levers in said slots having portions engaging both members, and a circumferentially disposed band embracing the operating member to close said slots and removable to permit removal of the levers.

6. In a transmission, a clutch engaging member, an operating member surrounding and slidable on said clutch engaging member, both members having radially aligned slots extending through the operating member, radially disposed connecting levers in said slots having portions engaging both members, a circumferentially disposed removable band embracing the operating member, and spring pressed latches carried by the operating member and engaging the band to retain it in position.

7. In a transmission, a shaft, a clutch engaging member slidable thereon, an operating member slidable on the clutch engaging member, said members having radially disposed slots extending through the operating member, levers in said slots fulcrumed on the shaft and bearing on the members, said levers being removable through the slots in the operating member, an axially removable retaining means embracing the operating member and closing the ends of the slots.

8. In a transmission mechanism, a clutch engaging member, an operating member surrounding and slidable on said clutch engaging member, both members having radially aligned slots therethrough, levers disposed in said slots to connect said members in operative relation, said levers being removable endwise from said slots, and means associated with the slots in said operating member for retaining said levers in operative position.

9. In a transmission mechanism, a clutch engaging member, an operating member surrounding and slidable on said clutch engaging member, both of said members having radially aligned slots therethrough, levers disposed in said slots to connect said members in operative relation, said levers being removable endwise from said slots, band means surrounding the slots in said operating member and retaining the levers in operative position, and plunger means in said operating member engaging the band means to retain the same in slot closing position.

10. In a transmission mechanism, a clutch engaging member, an operating member surrounding and slidable on said clutch engaging member, both members having radially aligned slots therethrough, levers disposed in said slots to connect said members in operative relation, said levers being removable endwise from said slots, a band member surrounding the slots in said operating member, plunger means slidable in the operating member having retaining means extending through said band member, and springs in said operating member urging said plunger means toward said band member.

11. In a transmission mechanism having a driving shaft and a driven shaft, a clutch device comprising a clutch engaging member, an operating member surrounding and slidable on said clutch engaging member, both members having radially aligned slots, levers disposed in said slots fulcrumed in said driven shaft and connecting said members in operative relation, said levers being removable endwise from said slots and said shaft, and means associated with the slots in said operative member retaining said levers in operative position.

12. In a transmission mechanism having a driving shaft and a driven shaft, a clutch device for said shafts comprising a clutch element slidable on the driven shaft and engageable with the driving shaft, said clutch element having radially extending slots therethrough, a slidable shifter sleeve encircling the clutch element and having slots therein aligning with the slots in the clutch element, and rigid levers extending through the slots in the clutch element, the ends of said levers being fulcrumed in the driven shaft and the slots in the shifter sleeve.

13. In a transmission having a driving and a driven member, a clutch device adapted to operatively connect said members comprising an axially movable clutch member, an axially slidable operating sleeve telescoping the movable clutch member, levers anchored to the driven member to actuate said movable member from the operating sleeve, and spring pressed members radially disposed in the movable member adapted to interlock said member and sleeve in clutch engaging relation.

14. In a transmission having a driving and a driven member, a clutch device including a clutch element movable axially of said members, an operating member telescoping the clutch element, radially extending oscillatory levers anchored to said driven member and connecting said operating member to said clutch element, and a latch device yieldably connecting said operating member and said clutch element in clutch engaged position.

In testimony whereof I affix my signature.

JESSE G. VINCENT.